US009855976B2

(12) United States Patent
Hartz et al.

(10) Patent No.: US 9,855,976 B2
(45) Date of Patent: Jan. 2, 2018

(54) ACTUATION SYSTEM FOR HOOD OF A MACHINE (71) Applicant: Caterpillar Inc., Peoria, IL (US)

(72) Inventors: Phillip A. Hartz, Sugar Grove, IL (US); Matthew M. DeSanto, Maple Park, IL (US); Daniel A. Hatfield, Rochelle, IL (US)

(73) Assignee: Caterpillar Inc., Peoria, IL (US)

( * ) Notice: Subject to any disclaimer, the term of this patent is extended or adjusted under 35 U.S.C. 154(b) by 415 days.

(21) Appl. No.: 14/601,725

(22) Filed: Jan. 21, 2015

(65) Prior Publication Data

US 2016/0208457 A1   Jul. 21, 2016

(51) Int. Cl.
*B62D 25/12* (2006.01)
*E02F 9/08* (2006.01)
*E05F 15/616* (2015.01)
*E05F 15/622* (2015.01)

(52) U.S. Cl.
CPC ............ *B62D 25/12* (2013.01); *E02F 9/0833* (2013.01); *E02F 9/0891* (2013.01); *E05F 15/616* (2015.01); *E05F 15/622* (2015.01); *E05Y 2600/626* (2013.01); *E05Y 2900/518* (2013.01); *E05Y 2900/536* (2013.01)

(58) Field of Classification Search
CPC ...... B62D 25/10; B62D 25/105; B62D 25/12; E02F 9/0891; E02F 9/0833; E05F 15/616; E05F 15/622; E05Y 2600/626; E05Y 2900/518; E05Y 2900/536
USPC .................. 180/69.2, 69.21, 69.24
See application file for complete search history.

(56) References Cited

U.S. PATENT DOCUMENTS

| 4,281,733 | A | * | 8/1981 | Miller | B62D 25/12 180/69.21 |
|---|---|---|---|---|---|
| 4,991,675 | A | * | 2/1991 | Tosconi | B62D 25/10 180/69.21 |
| 5,890,556 | A | * | 4/1999 | Shearn | B62D 25/12 16/273 |
| 6,079,767 | A | | 6/2000 | Faubert et al. | |
| 7,014,258 | B2 | | 3/2006 | Schubring et al. | |
| 7,334,656 | B2 | | 2/2008 | Kramarczyk et al. | |
| 7,992,665 | B2 | | 8/2011 | Giovannini et al. | |
| 8,231,149 | B1 | | 7/2012 | Shelby | |

(Continued)

FOREIGN PATENT DOCUMENTS

CN   203129822   8/2013

*Primary Examiner* — John D Walters (57) ABSTRACT

A mounting member for an actuator of a machine is disclosed. The actuator has a cylinder defining a longitudinal direction and a motor disposed adjacent to a mounting end of the cylinder. The actuator has a first angular orientation and a second angular orientation about the longitudinal direction with respect to the mounting member. The motor is disposed proximal to the mounting member in the first angular orientation and disposed distal to the mounting member in the second angular orientation. The mounting member includes a base portion to couple to a frame of the machine and a bracket portion extending from the base portion. The bracket portion is coupled to the mounting end of the cylinder. The mounting member further includes a guide portion extending from the base portion to prevent coupling of the actuator to the bracket portion in the first angular orientation.

16 Claims, 6 Drawing Sheets

(56) References Cited

U.S. PATENT DOCUMENTS 8,511,717 B2 8/2013 Fulmer et al.
2011/0031374 A1 2/2011 Drux et al.

* cited by examiner

ACTUATION SYSTEM FOR HOOD OF A MACHINE

TECHNICAL FIELD

The present disclosure relates to an actuation system for a hood of a machine.

BACKGROUND

The engine compartment of machines, such as mining trucks, wheel loaders, excavators, and the like is typically enclosed by a hood. The hood is coupled to a frame of the machine and may be operated between an opened position and a closed position by an actuator. The actuator includes a cylinder and a motor disposed at a mounting end of the cylinder. A rod is engaged with the motor and moves between an extended position and a retracted position within the cylinder upon actuation of the motor. The mounting end of the actuator is coupled to a mounting member, which is mounted on the frame of the machine. If the mounting end of the cylinder is coupled to the mounting member in an orientation that is not desirable, then the motor may interfere with the mounting member during the movement of the hood between the opened position and the closed position, and hence, cause damage to the actuator.

U.S. Pat. No. 7,014,258 (the '258 patent) discloses error proof anti-chucking wedge assemblies. The wedge assembly includes a left wedge assembly and a right wedge assembly. The right and left wedge assemblies are mounted on a right edge and left edge, respectively, of a lift-gate door. A first set of alignment apertures is provided on the door to receive a first set of pins disposed on the right wedge assembly such that the right wedge assembly is mountable on the right edge of the lift-gate door. Similarly a second set of alignment apertures is provided on the door to receive a second set of pins disposed on the left wedge assembly such that the left wedge assembly is mountable on the left edge of the lift-gate door. In both the right and left wedge assemblies, defining the first and second set of alignment apertures in corresponding mounting areas of the door require stringent dimensional accuracy.

SUMMARY OF THE DISCLOSURE

In one aspect of the present disclosure, a mounting member for an actuator of a machine is provided. The actuator has a cylinder defining a longitudinal direction and a motor disposed adjacent to a mounting end of the cylinder. The actuator has a first angular orientation and a second angular orientation about the longitudinal direction with respect to the mounting member. The motor is disposed proximal to the mounting member in the first angular orientation and disposed distal to the mounting member in the second angular orientation. The mounting member includes a base portion configured to be coupled to a frame of the machine. The base portion has a first end and a second end. The mounting member further includes a bracket portion extending from the first end of the base portion. The bracket portion is configured to be detachably coupled to the mounting end of the cylinder. The mounting member further includes a guide portion extending from the second end of the base portion. The guide portion is configured to prevent coupling of the actuator to the bracket portion in the first angular orientation.

In another aspect of the present disclosure, an actuation system for a hood of a machine is provided. The actuation system is configured to move the hood relative to a frame of the machine between an opened position and a closed position. The actuation system includes an actuator configured to selectively move the hood between the opened position and the closed position. The actuator has a cylinder defining a longitudinal direction and a motor disposed adjacent to a mounting end of the cylinder. The actuation system further includes a mounting member configured to pivotally couple the mounting end of the cylinder with the frame. The actuator has a first angular orientation and a second angular orientation about the longitudinal direction with respect to the mounting member. The motor is disposed proximal to the mounting member in the first angular orientation and disposed distal to the mounting member in the second angular orientation. The mounting member includes a base portion configured to be coupled to a frame of the machine. The base portion has a first end and a second end. The mounting member further includes a bracket portion extending from the first end of the base portion. The bracket portion is configured to be detachably coupled to the mounting end of the cylinder. The mounting member further includes a guide portion extending from the second end of the base portion. The guide portion is configured to prevent coupling of the actuator to the bracket portion in the first angular orientation.

In yet another aspect of the present disclosure, an actuation system for a hood of a machine is provided. The actuation system is configured to move the hood relative to a frame of the machine between an opened position and a closed position. The actuation system includes an actuator configured to selectively move the hood between the opened position and the closed position. The actuator has a cylinder defining a longitudinal direction and a motor disposed adjacent to a mounting end of the cylinder. The mounting end includes a bore having a first portion and a second portion adjoining the first portion. A diameter of the first portion is greater than a diameter of the second portion. The actuation system includes a mounting member configured to pivotally couple the mounting end of the cylinder with the frame. The actuator has a first angular orientation and a second angular orientation about the longitudinal direction with respect to the mounting member. The motor is disposed proximal to the mounting member in the first angular orientation and disposed distal to the mounting member in the second angular orientation.

The mounting member includes a base portion configured to be coupled to the frame of the machine. The base portion has a first end and a second end distal from the first end. The mounting member includes a bracket portion extending from the first end of the base portion. The bracket portion is configured to be detachably coupled to the mounting end of the cylinder. The bracket portion includes a first bracket portion extending from the first end of the base portion and defining a first aperture therethrough and a second bracket portion extending from the first end of the base portion and spaced apart from the first bracket portion. The second bracket portion defining a second aperture therethrough. The first bracket portion and the second bracket portion receive the mounting end of the cylinder therebetween. The first bracket portion is disposed adjacent to the first portion of the bore of the mounting end in the second angular orientation of the actuator. The mounting member further includes a fastening member configured to detachably couple the mounting end of the cylinder with the first bracket portion and the second bracket portion. The fastening member includes a first elongate portion configured to be at least partly received in the first aperture of the first bracket portion and the first portion of the bore at the mounting end of the cylinder. The fastening member further includes a second elongate portion adjoining the first elongate portion. The second elongate portion is configured to be at least partly received in the second aperture of the second bracket portion and the second portion of the bore at the mounting end of the cylinder. Diameters of the first elongate portion of the fastening member, the first aperture of the first bracket portion and the first portion of the bore are greater than the diameters of the second elongate portion of the fastening member, the second aperture of the second bracket portion and the second portion of the bore, respectively, to allow coupling of the actuator to the bracket portion in the second angular orientation.

Other features and aspects of this disclosure will be apparent from the following description and the accompanying drawings.

DETAILED DESCRIPTION

Reference will now be made in detail to specific embodiments or features, examples of which are illustrated in the accompanying drawings. Wherever possible, corresponding or similar reference numbers will be used throughout the drawings to refer to the same or corresponding parts.

Figure 1:
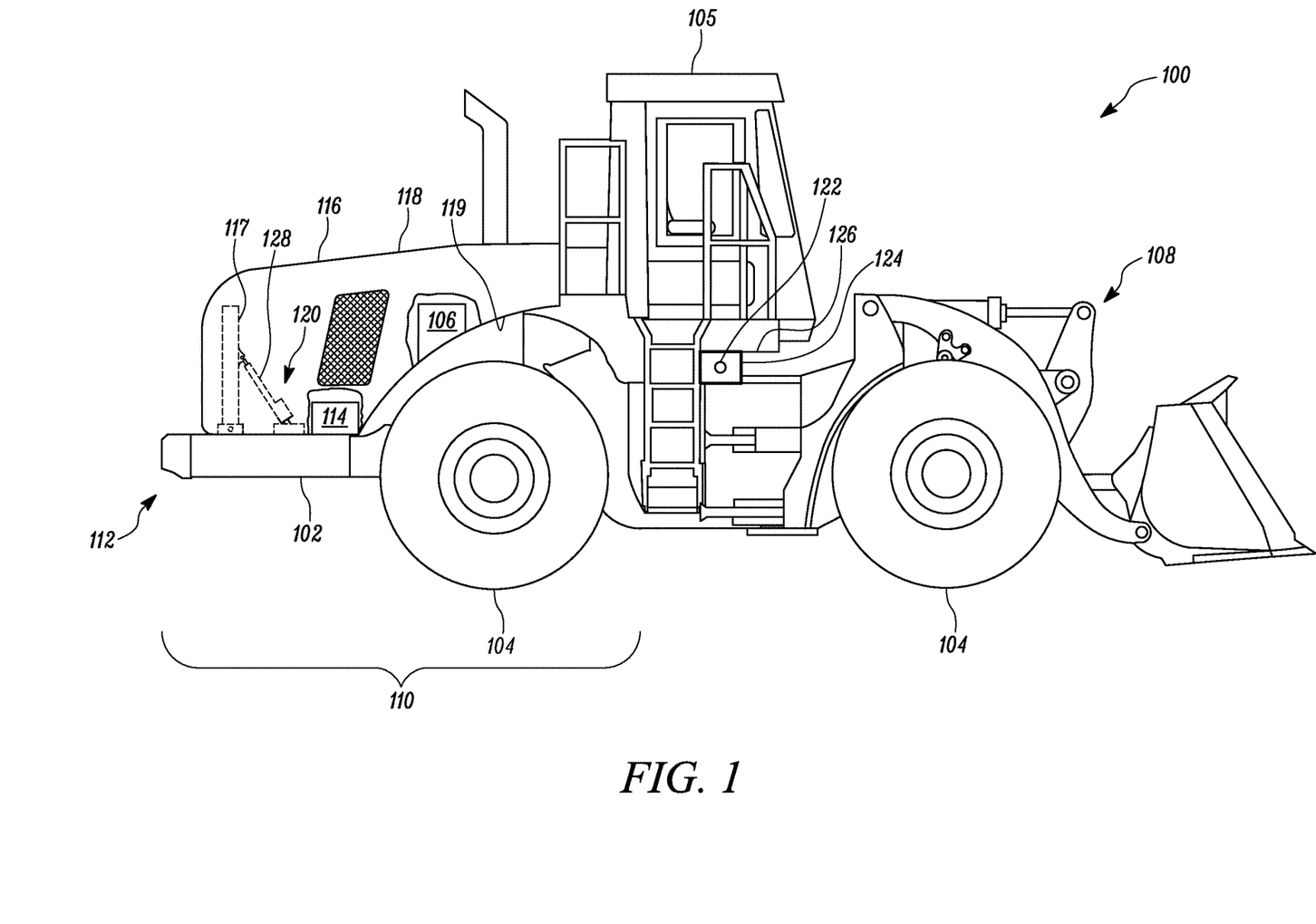
FIG. 1 is a side view of an exemplary machine including an actuation system for a hood of the machine.

FIG. 1 shows a side view of an exemplary machine 100. In the illustrated embodiment, the machine 100 is a wheel loader. Although a wheel loader is disclosed, it should be noted that the machine 100 may alternatively be embodied in the form of a backhoe loader, an excavator, a dozer, an off-highway truck or other machines typically employed in applications, such as mining, forestry, waste management, construction, agriculture, transportation and the like. The present disclosure is generally relevant to any machine having a hood, as will become evident from the following description.

The machine 100 includes a frame 102 having a drive system (not shown) supported thereon for driving ground engaging members 104 of the machine 100. In the embodiment of FIG. 1, the ground engaging members 104 includes front wheel and rear wheel. It may also be contemplated that the ground engaging members 104 may be tracks.

The drive system includes a power source, such as an engine 106 to supply power to various components including, but not limited to, the ground engaging members 104 and an implement system 108. The engine 106 is located within an engine compartment 110 adjacent to a rear end 112 of the machine 100. The engine compartment 110 includes various components associated with the engine 106, such as a radiator and a fuel injection pump, and others. In an embodiment, the engine 106 may be coupled to a generator (not shown) for generating electric power. The generator may be coupled with one or more batteries 114 disposed adjacent to the engine compartment 110 of the machine 100 to charge the batteries 114. The batteries 114 may be configured to supply electric power to the various electric components and the lighting system of the machine 100, when the engine 106 is inoperative.

The machine 100 further includes a hood 116 configured to enclose the engine compartment 110 of the machine 100. In an embodiment, the hood 116 may include an upper panel 118 and one or more side panels 119 extending from the upper panel 118. The upper panel 118 and the side panels 119 may be together configured to enclose the engine compartment 110. The hood 116 may further include one or more reinforcing members 117 to reinforce the upper panel 118 and the side panels 119 and to support the hood 116 on the frame 102 of the machine 100. The reinforcing members 117 may be fastened to an inner surface of the hood 116 via a welding method. Specifically, the hood 116 may be used for protecting the engine 106, the radiator, the fuel injection pump, the batteries 114 and other components associated with the engine 106 from water and dust within the engine compartment 110. Further, the hood 116 may also avoid physical contact of any external body with the components disposed within the engine compartment 110.

The machine 100 further includes an actuation system 120 for the hood 116. The actuation system 120 is configured to move the hood 116 relative to the frame 102 of the machine 100 between an opened position and a closed position. The actuation system 120 is disposed adjacent to the rear end 112 of the machine 100 within the engine compartment 110. Further, the actuation system 120 is configured to receive electric power from the batteries 114 to move the hood 116 between the closed position and the opened position. The hood 116 may be moved to the opened position for maintenance and/or service of the engine 106, the batteries 114 and the other components disposed within the engine compartment 110.

The machine 100 further includes an input member 122 configured to be in electric communication with the actuation system 120 and the batteries 114. In an exemplary embodiment, the input member 122 may move in a first direction and a second direction to move the hood 116 between the opened position and the closed position, respectively, based on a user input. The input member 122 may include a neutral position. If an operator releases the input member 122 after moving to the first direction or the second direction, the input member 122 may come back to the neutral position. In the illustrated embodiment, the machine 100 includes a box 124 formed below a floor panel 126 of the machine 100. The input member 122 is disposed within the box 124. In an alternative embodiment, the input member 122 may be disposed within an operator cab 105 of the machine 100. However, it may be contemplated that the input member 122 may be disposed at any location of the machine 100.

Figure 2:
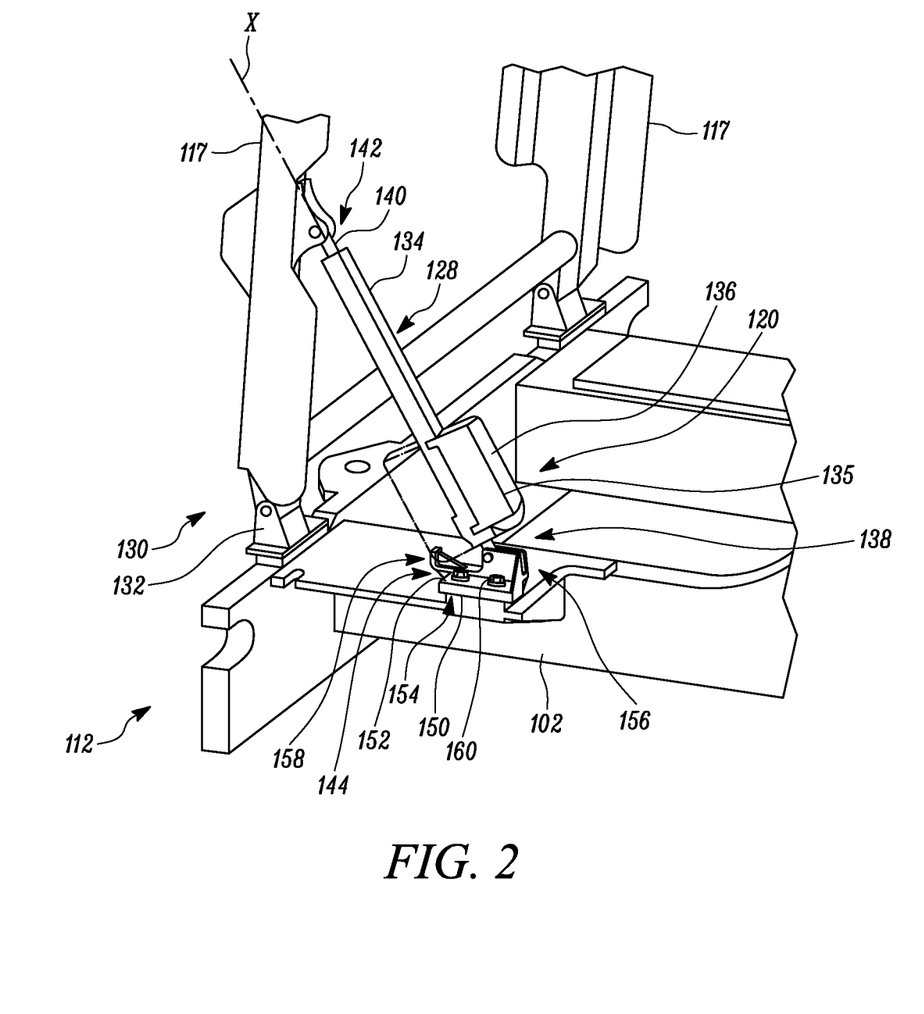
FIG. 2 is a perspective view of an actuator of the actuation system corresponds to a closed position of the hood of the machine.

FIG. 2 illustrates perspective view of an actuator, such as a linear actuator 128 of the actuation system 120 corresponding to the closed position of the hood 116. FIG. 2 also illustrates a pair of the reinforcing members 117 associated with the hood 116 (shown in FIG. 1). A bottom end 130 of the reinforcing members 117 may be pivotally mounted on a pivot pin member 132 disposed on the frame 102 of the machine 100. The pivot pin member 132 may be mounted on the frame 102 adjacent to the rear end 112 of the machine 100 such that the hood 116 may be moved between the closed position and the opened position about the pivot pin member 132.

The linear actuator 128 is configured to couple between the frame 102 and the hood 116 to move the hood 116 between the closed position and the opened position. The linear actuator 128 includes a cylinder 134 defining a longitudinal direction 'X'. The linear actuator 128 further includes a motor 136 disposed adjacent to a mounting end 138 of the cylinder 134. The motor 136 is configured to be in electric communication with the batteries 114 to receive required electric power to operate the hood 116. The linear actuator 128 further includes a rod 140 movable between an extended position and a retracted position within the cylinder 134. The rod 140 may be engaged with the motor 136 and moved between the extended position and the retracted position based on actuation of the motor 136. A free end 142 of the rod 140 is pivotally coupled to one of the reinforcing members 117 attached to the side panels 119. The input member 122 is configured to be in electric communication with the motor 136 and the batteries 114. Based on the user input received by the input member 122, the motor 136 moves the rod 140 between the retracted position and the extended position to move the hood 116 between the closed position and the opened position, respectively.

The actuation system 120 further includes a mounting member 144 mounted on the frame 102 adjacent to the rear end 112 of the machine 100 proximate to the pivot pin member 132. The mounting member 144 is configured to detachably couple to the mounting end 138 of the cylinder 134. Thus the linear actuator 128 is coupled between one of the reinforcing members 117 of the hood 116 and the mounting member 144.

Referring to FIG. 2, a first angular orientation and a second angular orientation of the linear actuator 128 relative to the mounting member 144 are described in detail below. The mounting end 138 of the linear actuator 128 is coupled to the mounting member 144 in the first angular orientation about the longitudinal direction 'X' with respect to the mounting member 144. In the first angular orientation, the motor 136 is disposed proximal to the mounting member 144. The first angular orientation of the motor 136 relative to the cylinder 134 is shown in dotted lines.

The mounting end 138 of the linear actuator 128 is coupled to the mounting member 144 in the second angular orientation about the longitudinal direction 'X' with respect to the mounting member 144. In the second angular orientation, the motor 136 is disposed distal to the mounting member 144 as shown in solid lines in FIG. 2.

In an exemplary embodiment, the cylinder 134 may include a housing member 135 for securing the motor 136 therein. The housing member 135 may extend radially from the cylinder 134 at the mounting end 138. Hence, in the first angular orientation of the linear actuator 128, the housing member 135 may be positioned below the cylinder 134 proximate to the mounting member 144. In the second angular orientation of the linear actuator 128, the housing member 135 may be positioned above the cylinder 134 distal to the mounting member 144. In various embodiments, the machine 100 may include two or more linear actuators 128 disposed at both sides of the machine 100 adjacent to the rear end 112.

Figure 3:
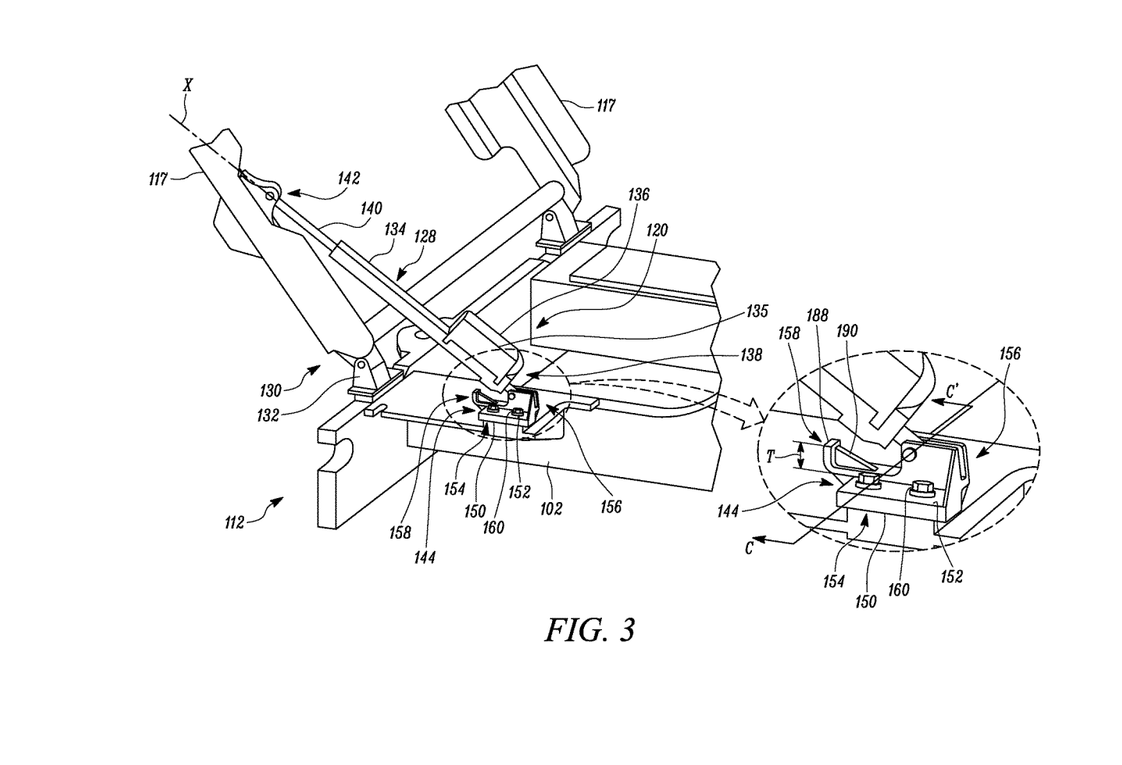
FIG. 3 is a perspective view of the actuator corresponds to an opened position of the hood of the machine.

FIG. 3 illustrates a perspective view of the linear actuator 128 corresponding to the opened position of the hood 116. When the operator moves the input member 122 to the first direction, an electric communication between the batteries 114 and the linear actuator 128 may be established through one or more cables (not shown). The motor 136 actuates the rod 140 to move towards the extended position such that the hood 116 moves to the opened position.

For moving the hood 116 from the opened position to the closed position (shown in FIG. 2), the operator may move the input member 122 to the second direction. When the input member 122 moves towards the second direction, an electric communication between the batteries 114 and the linear actuator 128 may be established through the cables. The motor 136 may further actuate the rod 140 to move towards the retracted position such that the hood 116 moves towards the closed position.

Figure 4:
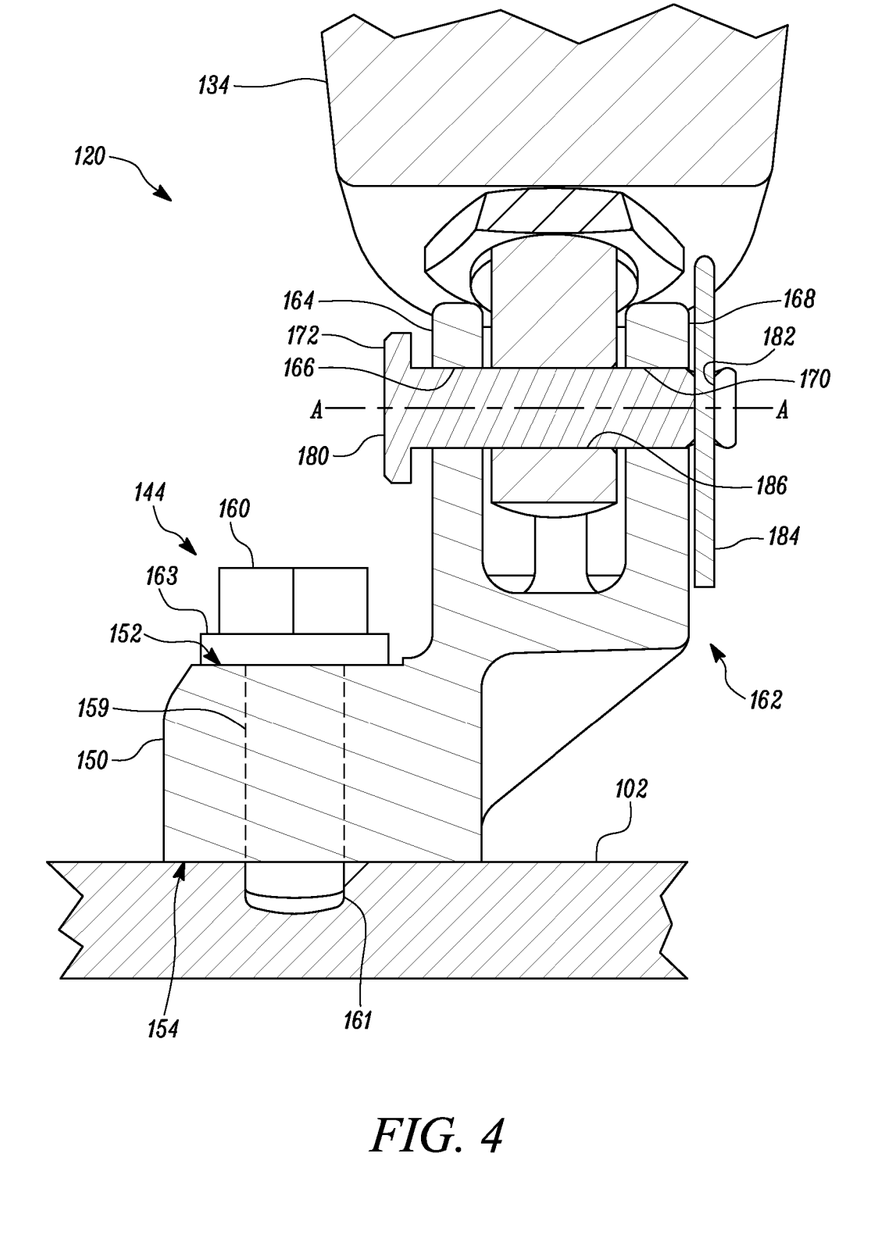
FIG. 4 is a sectional view taken along line C-C' of FIG. 3 showing coupling of the actuator with the mounting member.

FIG. 4 is a sectional view taken along line C-C' of FIG. 3 showing coupling of the linear actuator 128 with the mounting member 144. The mounting member 144 includes a base portion 150 coupled to the frame 102 of the machine 100. The base portion 150 has a top surface 152 and a bottom surface 154 distal from the top surface 152. The bottom surface 154 may be adapted to abut a surface of the frame 102 for coupling the base portion 150 to the frame 102. The base portion 150 further includes a first end 156 and a second end 158. The base portion 150 further includes a plurality of mounting apertures 159 to receive fasteners 160, such as bolts to couple the base portion 150 to the frame 102. The plurality of mounting apertures 159 extends through the base portion 150 between the top surface 152 and the bottom surface 154. The frame 102 includes a plurality of holes 161 corresponding to the plurality of mounting apertures 159 of the base portion 150. The plurality of holes 161 is configured to engage with the fasteners 160. A washer 163 is disposed between the top surface 152 of the base portion 150 and the fasteners 160.

The mounting member 144 further includes a bracket portion 162 extending from the first end 156 of the base portion 150. The bracket portion 162 is configured to be detachably coupled to the mounting end 138 of the cylinder 134. The bracket portion 162 includes a first bracket portion 164 extending from the first end 156 of the base portion 150 and defines a first aperture 166 therethrough. The first bracket portion 164 extends vertically from the top surface 152 of the base portion 150. The first aperture 166 is defined along a transverse axis 'A' defined by the first bracket portion 164. The bracket portion 162 further includes a second bracket portion 168 extending from the first end 156 of the base portion 150 and spaced apart from the first bracket portion 164. The second bracket portion 168 defines a second aperture 170 therethrough. The second bracket portion 168 extends vertically from the top surface 152 of the base portion 150 spaced transversely from the first bracket portion 164. The second aperture 170 is defined along the transverse axis 'A' such that the first aperture 166 and the second aperture 170 together may be configured to receive a fastening member 172. The first bracket portion 164 and the second bracket portion 168 are detachably coupled to the mounting end 138 of the cylinder 134 via the fastening member 172.

The fastening member 172 includes a shank 174 extending between a first end 176 and a second end 178. In the illustrated embodiment, the shank 174 may have a circular cross section. However, it may be contemplated that the cross section of the shank 174 may be one of a square, a rectangular and an elliptical shape. The circular cross section of the shank 174 may define a diameter adapted to be received through the first aperture 166 and the second aperture 170 of the first bracket portion 164 and the second bracket portion 168, respectively. The fastening member 172 further includes a head portion 180 adjacent to the first end 176 of the shank 174. The head portion 180 has a diameter greater than the diameter of one of the first aperture 166 and the second aperture 170. The fastening member 172 further includes a hole 182 adjacent to the second end 178 of the shank 174. The hole 182 is defined perpendicular to an axis defined by the shank 174. The hole 182 is configured to receive a retaining pin 184. In an example, the retaining pin 184 may be a cotter pin. The head portion 180 and the retaining pin 184 received in the hole 182 may be configured to minimize movement of the fastening member 172 along the transverse axis 'A' when the fastening member 172 is coupled to the bracket portion 162.

The fastening member 172 is at least partly received in the first aperture 166 of the first bracket portion 164 and the second aperture 170 of the second bracket portion 168. The fastening member 172 is further configured to be received through a bore 186 defined in the mounting end 138 of the cylinder 134. Thus, the linear actuator 128 is detachably coupled to the bracket portion 162 via the fastening member 172. Further, the linear actuator 128 may be rotatable about the fastening member 172.

Referring to FIGS. 3 and 4, the mounting member 144 further includes a guide portion 188 extending from the second end 158 of the base portion 150. The guide portion 188 is configured to prevent coupling of the linear actuator 128 to the bracket portion 162 in the first angular orientation thereof. In an embodiment, the guide portion 188 is integrally formed with the base portion 150. Further, the guide portion 188 extends vertically from the top surface 152 to defines a thickness 'T' with respect to the top surface 152 of the base portion 150 to prevent coupling of the linear actuator 128 to the bracket portion 162 in the first angular orientation. Further, a rib portion 190 is provided between the guide portion 188 and the base portion 150 to support the guide portion 188 with the base portion 150. Moreover, in the second operational configuration of the linear actuator 128, a clearance is defined between the cylinder 134 and the mounting member 144, including the guide portion 188 (FIG. 3). Thus, the linear actuator 128 is coupled between the hood 116 and the mounting member 144 in the second angular orientation. If a user were to attempt to couple the linear actuator 128 to the bracket portion 162 in the first angular orientation, the guide portion 188 would interfere with the linear actuator 128 in a manner that would prevent its coupling in the first angular orientation. And this may remind the user to couple the linear actuator 128 in the second angular orientation.

Figure 5:
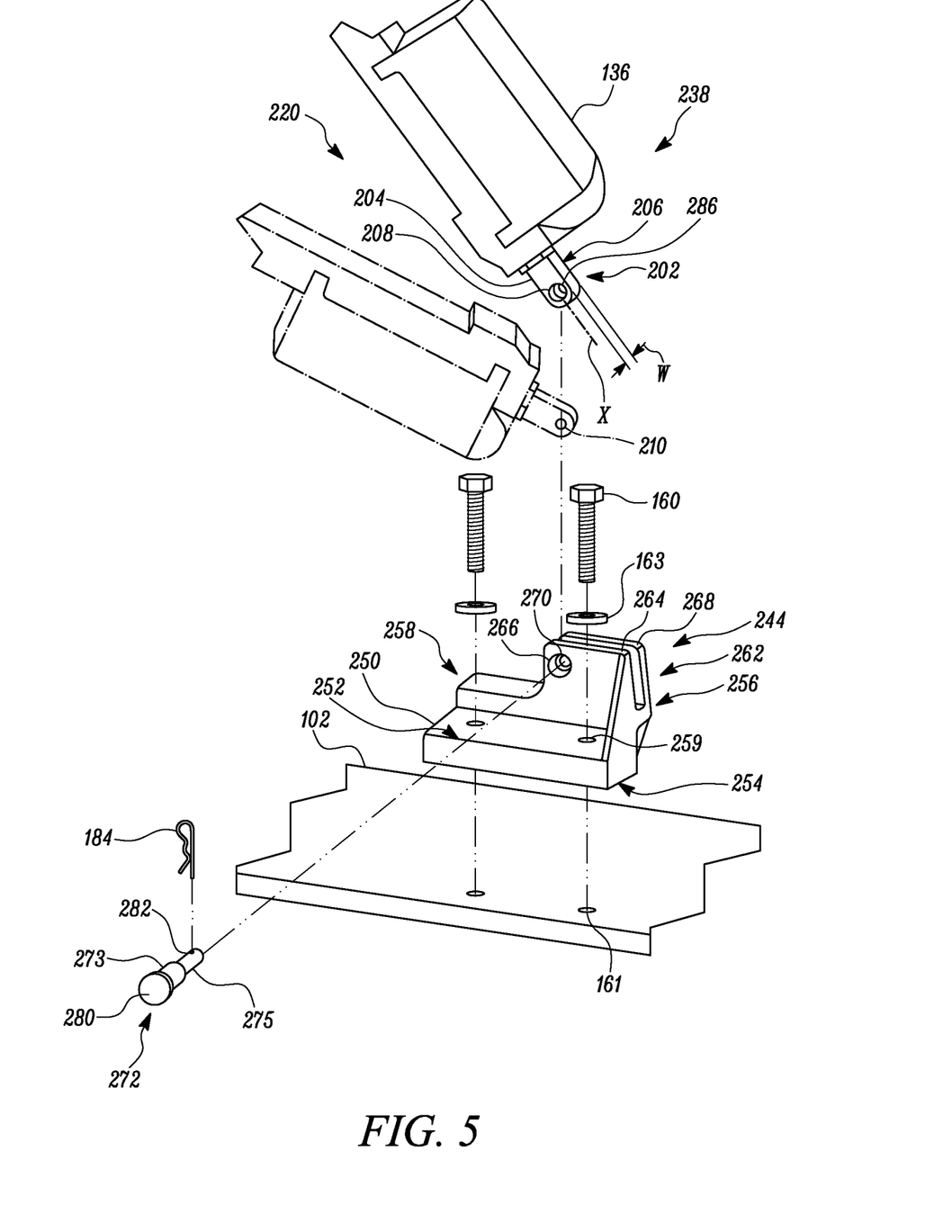
FIG. 5 is an exploded view showing a mounting member of an actuation system, according to another embodiment of the present disclosure.
Figure 6:
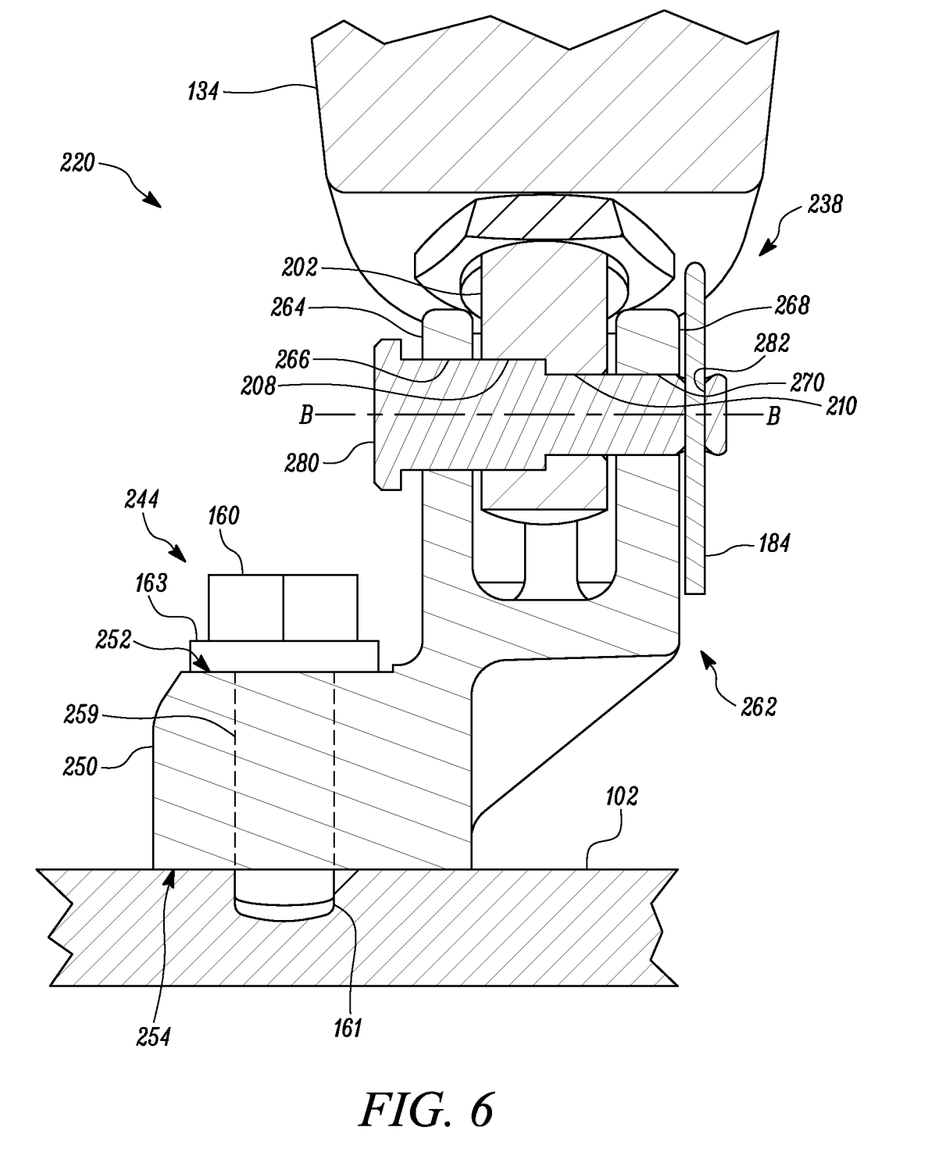
FIG. 6 is a sectional view showing coupling of the actuator with the mounting member of FIG. 5.

FIGS. 5 and 6 show a mounting member 244 of an actuation system 220, according to another embodiment of the present disclosure. The actuation system 220 includes the linear actuator 128 to selectively move the hood 116 between the opened position and the closed position. The linear actuator 128 has the cylinder 134 defining the longitudinal direction 'X'. The motor 136 is disposed adjacent to a mounting end 238 of the cylinder 134.

The actuation system 220 further includes a mounting member 244 mounted on the frame 102 adjacent to the rear end 112 of the machine 100. The mounting member 244 is further configured to detachably couple with the mounting end 238 of the cylinder 134. Thus the linear actuator 128 is coupled between one of the reinforcement members 117 of the hood 116 and the mounting member 244.

The mounting member 244 includes a base portion 250 coupled to the frame 102 of the machine 100. The base portion 250 has a top surface 252 and a bottom surface 254 distal from the top surface 252. The base portion 250 further includes a first end 256 and a second end 258. The base portion 250 further includes a plurality of mounting apertures 259 to receive the fasteners 160, such as bolts to couple the base portion 250 to the frame 102. The plurality of mounting apertures 259 may extend through the base portion 250 between the top surface 252 and the bottom surface 254. The frame 102 includes a plurality of holes 161 corresponding to the plurality of mounting apertures 259 of the base portion 250 to engage with the fasteners 160. The washer 163 is disposed between the top surface 252 of the base portion 250 and the fasteners 160.

Similar to the first and the second angular orientations of the linear actuator 128 with respect to the mounting member 144, the mounting end 238 of the linear actuator 128 may be disposed on the mounting member 244 in a first angular orientation and a second angular orientation about the longitudinal direction 'X' with respect to the mounting member 244. The first angular orientation of the linear actuator 128 relative to the mounting member 244 is shown in dotted lines in FIG. 5.

The mounting member 244 further includes a bracket portion 262 extends from the first end 256 of the base portion 250. The bracket portion 162 is configured to be detachably coupled to the mounting end 238 of the cylinder 134. The bracket portion 262 includes a first bracket portion 264 extends from the first end 256 of the base portion 250 and defines a first aperture 266 therethrough. The first aperture 266 is defined along a transverse axis 'B' defined by the first bracket portion 264. The bracket portion 262 further includes a second bracket portion 268 extends from the first end 256 of the base portion 250 and spaced apart from the first bracket portion 264. The second bracket portion 268 defines a second aperture 270 therethrough. The first aperture 166 has a diameter greater than a diameter of the second aperture 270. The first aperture 166 and the second aperture 270 are aligned coaxially along the transverse axis 'B' to receive a fastening member 272. The first bracket portion 264 and the second bracket portion 268 are detachably coupled to the mounting end 138 of the cylinder 134 via the fastening member 272.

The fastening member 272 includes a first elongate portion 273 configured to be at least partly received in the first aperture 266 of the first bracket portion 264 and a second elongate portion 275 adjoining the first elongate portion 273. The second elongate portion 275 is configured to be at least partly received in the second aperture 270 of the second bracket portion 268. A diameter of the first elongate portion 273 is greater than a diameter of the second elongate portion 275. Further, the diameters of the first aperture 266 and the second aperture 270 are greater than the diameters of the first elongate portion 273 and the second elongate portion 275, respectively.

The fastening member 272 further includes a head portion 280 adjoining the first elongate portion 273 distal to the second elongate portion 275. The head portion 280 has a diameter greater than the diameter of the first elongate portion 273. The second elongate portion 275 of the fastening member 272 defines a hole 282 therethrough to receive the retaining pin 184. The hole 282 defined in the second elongate portion 275 is perpendicular to an axis defined by the fastening member 272. The head portion 280 and the retaining pin 184 received in the hole 282 may be configured to minimize movement of the fastening member 272 in the bracket portion 262 along the transvers axis 'B', when the fastening member 272 is coupled to the bracket portion 262.

The mounting end 238 of the cylinder 134 includes a coupling portion 202 adapted to be disposed between the first bracket portion 264 and the second bracket portion 268.

The coupling portion 202 includes a first face 204 and a second face 206 distal from the first face 204. A width 'W' may be defined between the first face 204 and the second face 206. The width 'W' of the coupling portion 202 may be less than a width defined between the first bracket portion 264 and the second bracket portion 268. Thus the coupling portion 202 is pivotally disposed between the first bracket portion 264 and the second bracket portion 268.

In another embodiment, the free end 142 of the rod 140 may alternatively or additionally include a bore (not shown) having a first portion and a second portion adjoining the first portion similar to the bore 286 defined in the mounting end 238 of the cylinder 134. Further, the reinforcing member 117 may include a mounting member (not shown) having a first bracket portion and a second bracket portion configured to be detachably coupled with the free end 142 of the rod 140. The first bracket portion may include a first aperture and a second bracket portion may include a second aperture. The first aperture of the first bracket portion and the first portion of the bore may have a diameter greater than a diameter of the second aperture and the second portion, respectively. The first aperture, the second aperture and the bore together may be configured to receive the fastening member 272. The first portion of the bore may be disposed adjacent to the first bracket portion to couple the free end 142 of the rod 140 via the fastening member 272 in the second angular orientation of the linear actuator 128. In yet another embodiment, the mounting member 244 may include a guide portion (not shown) adjacent to the second end 258 thereof similar to the guide portion 188 of the mounting member 144 described with reference to FIG. 3.

FIG. 6 is a sectional view showing coupling of the linear actuator 128 with the mounting member 244. The coupling portion 202 includes a bore 286 extends between the first face 204 and the second face 206. The bore 286 has a first portion 208 and a second portion 210 adjoining the first portion 208. The first portion 208 has a diameter greater than a diameter of the second portion 210. The first portion 208 extends from the first face 204 of the coupling portion 202. The first portion 208 is adapted to receive the first elongate portion 273 of the fastening member 272 and the second portion 210 is adapted to receive the second elongate portion 275 of the fastening member 272.

During assembly of the linear actuator 128 in the machine 100, the mounting member 244 is mounted on the frame 102 via the fasteners 160. The fasteners 160 may be inserted from the top surface 252 of the base portion 250 to engage with the plurality of holes 161 of the frame 102. The washer 163 may be disposed between each of the fasteners 160 and the top surface 252 of the base portion 250 to increase frictional resistance between the fasteners 160 and the base portion 150. The coupling portion 202 at the mounting end 238 of the linear actuator 128 may be disposed between the first bracket portion 264 and the second bracket portion 268. Specifically, the first face 204 of the coupling portion 202 is disposed adjacent to the first bracket portion 264 such that the first portion 208 and the second portion 210 of the bore 286 align with the first aperture 266 and the second aperture 270, respectively. The fastening member 272 may be further inserted through the first aperture 266 of the first bracket portion 264 and the first portion 208 of the bore 286 to pivotally couple the linear actuator 128 with the mounting member 244. The retaining pin 184 may be further inserted through the hole 282 of the fastening member 272.

As described above, the diameters of the first portion 208 of the bore 286, the first elongate portion 273 of the fastening member 272, and the first aperture 266 of the first bracket portion 264 are greater than the respective diameters of the second portion 210 of the bore 286, the second elongate portion 275 of the fastening member 272, and the second aperture 270 of the second bracket portion 268. Hence, the fastening member 272 may only be inserted into the bore 286, and the first and second bracket portions 266, 268 in a position shown in FIG. 6 as the first and second elongate portions 273, 275 are aligned with the first and second portions 208, 210, and the first and second apertures 266, 270, respectively. Further, the first elongate portion 273 of the fastening member 272 may not be insertable within the second portion 210 of the bore 286 and the second bracket portions 266. Since, the position of the fastening member 272, as illustrated in FIG. 6, corresponds to the second angular orientation of the linear actuator 128, the mounting member 244 and the fastening member 272 may prevent assembly of the linear actuator 128 in the first angular orientation.

INDUSTRIAL APPLICABILITY

The present disclosure relates to an actuation system 120, 220 for moving the hood 116 between the opened position and the closed position relative to the frame 102 of the machine 100. The linear actuator 128 of the actuation system 120, 220 coupled between the hood 116 and the mounting member 144, 244 moves the hood 116 between the opened position and the closed position. The mounting member 144, 244 ensures coupling of the linear actuator 128 in the second angular orientation in order to prevent damage of the linear actuator 128 due to coupling of the linear actuator 128 in the first angular orientation.

Referring to FIGS. 3 and 4, the mounting member 114 includes the guide portion 188. The thickness 'T' of the guide portion 188 is defined in such a way that when the linear actuator 128 is coupled to the bracket portion 162 of the mounting member 144 in the first angular orientation, the motor 136 may interfere with the guide portion 188. Thereby, coupling the free end 142 of the rod 140 with the reinforcing members 117 of the hood 116 is prevented. Thus, the mounting member 144 allows coupling of the linear actuator 128 in the second angular orientation. Further, in the second angular orientation, the linear actuator 128 moves corresponding to the opened position and the closed position of the hood with respect to the fastening member 172.

Referring to FIGS. 5 and 6, the first portion 208 extending from the first face 204 of the coupling portion 202 is disposed adjacent to the first bracket portion 264. The first portion 208 is aligned with the first aperture 266 of the first bracket portion 264 to receive the first elongate portion 273 of the fastening member 272. The fastening member 272 is inserted through the first aperture 266, the bore 286 and the second aperture 270 to couple the linear actuator 128 to the bracket portion 262 of the mounting member 244 in the second angular orientation of the linear actuator 128. If the second portion 210 of the bore 286 is disposed adjacent to the first bracket portion 164, then the fastening member 272 can not be inserted through the bore 286 and the second aperture 270 of the second bracket portion 268. Thus, the linear actuator 128 is prevented from coupling to the mounting member 244 in the first angular orientation.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A mounting member for an actuator of a machine, the actuator having a cylinder defining a longitudinal direction and a motor disposed adjacent to a mounting end of the cylinder, the actuator having a first angular orientation and a second angular orientation about the longitudinal direction with respect to the mounting member, the motor disposed proximal to the mounting member in the first angular orientation and disposed distal to the mounting member in the second angular orientation, the mounting member comprising:
 a base portion configured to be coupled to a frame of the machine, the base portion having a first end and a second end;
 a bracket portion extending from the first end of the base portion, the bracket portion configured to be detachably coupled to the mounting end of the cylinder; and
 a guide portion extending from the second end of the base portion, the guide portion configured to prevent coupling of the actuator to the bracket portion in the first angular orientation.

2. The mounting member of claim 1, the bracket portion comprising:
 a first bracket portion extending from the first end of the base portion and defining a first aperture therethrough; and
 a second bracket portion extending from the first end of the base portion and spaced apart from the first bracket portion, the second bracket portion defining a second aperture therethrough, wherein the first bracket portion and the second bracket portion are configured to be detachably coupled to the mounting end of the cylinder via a fastening member.

3. The mounting member of claim 2, wherein the fastening member is at least partly received in the first aperture of the first bracket portion, the second aperture of the second bracket portion and a bore defined in the mounting end of the cylinder.

4. The mounting member of claim 3, wherein the fastening member extends between a first end and a second end, and wherein the fastening member comprises a head portion adjacent to the first end thereof, the head portion having a diameter greater than a diameter of one of the first aperture and the second aperture.

5. The mounting member of claim 4, wherein the fastening member comprises a hole adjacent to the second end thereof, the hole configured to receive a retaining pin therethrough.

6. The mounting member of claim 1, wherein the guiding portion is integrally formed with the base portion.

7. The mounting member of claim 1, wherein the guiding portion defines a thickness with respect to the base portion to prevent coupling of the actuator to the bracket portion in the first angular orientation.

8. The mounting member of claim 1, wherein the base portion defines a plurality of mounting apertures therethrough configured to receive fasteners to couple the base portion to the frame of the machine.

9. An actuation system for a hood of a machine, the actuation system being configured to move the hood relative to a frame of the machine between an opened position and a closed position, the actuation system comprising:
 an actuator configured to selectively move the hood between the opened position and the closed position, the actuator having a cylinder defining a longitudinal direction and a motor disposed adjacent to a mounting end of the cylinder; and
 a mounting member configured to pivotally couple the mounting end of the cylinder with the frame, wherein the actuator has a first angular orientation and a second angular orientation about the longitudinal direction with respect to the mounting member, the motor disposed proximal to the mounting member in the first angular orientation and disposed distal to the mounting member in the second angular orientation, the mounting member comprising:
  a base portion configured to be coupled to the frame of the machine, the base portion having a first end and a second end;
  a bracket portion extending from the first end of the base portion, the bracket portion configured to be detachably coupled to the mounting end of the cylinder; and
  a guide portion extending from the second end of the base portion, the guide portion configured to prevent coupling of the actuator to the bracket portion in the first angular orientation.

10. The actuation system of claim 9, the bracket portion comprising:
 a first bracket portion extending from the first end of the base portion and defining a first aperture therethrough; and
 a second bracket portion extending from the first end of the base portion and spaced apart from the first bracket portion, the second bracket portion defining a second aperture therethrough, wherein the first bracket portion and the second bracket portion are configured to be detachably coupled to the mounting end of the cylinder via a fastening member.

11. The actuation system of claim 10, wherein the fastening member is at least partly received in the first aperture of the first bracket portion, the second aperture of the second bracket portion and a bore defined in the mounting end of the cylinder.

12. The actuation system of claim 11, wherein the fastening member extends between a first end and a second end, and wherein the fastening member comprises a head portion adjacent to the first end thereof, the head portion having a diameter greater than a diameter of one of the first aperture and the second aperture.

13. The actuation system of claim 12, wherein the fastening member comprises a hole adjacent to the second end thereof, the hole configured to receive a retaining pin therethrough.

14. The actuation system of claim 9, wherein the guiding portion is integrally formed with the base portion.

15. The actuation system of claim 9, wherein the guiding portion defines a thickness with respect to the base portion to prevent coupling of the actuator to the bracket portion in the first angular orientation.

16. The actuation system of claim 9, wherein the base portion defines a plurality of mounting apertures therethrough configured to receive fasteners to couple the base portion to the frame of the machine.

* * * * *